US011137352B2

(12) United States Patent
Ribes Cortes et al.

(10) Patent No.: US 11,137,352 B2
(45) Date of Patent: Oct. 5, 2021

(54) PORTABLE DEVICE AND METHOD FOR ESTIMATING A PARAMETER OF A POLYMER

(71) Applicants: Electricite de France, Paris (FR); Sorbonne Universite, Paris (FR)

(72) Inventors: Alejandro Ribes Cortes, Paris (FR); Mohamed Ben Chouikha, Aubervilliers (FR)

(73) Assignees: Electricite de France; Sorbonne Universite

( * ) Notice: Subject to any disclaimer, the term of this patent is extended or adjusted under 35 U.S.C. 154(b) by 0 days.

(21) Appl. No.: 16/461,635

(22) PCT Filed: Nov. 17, 2017

(86) PCT No.: PCT/EP2017/079543
§ 371 (c)(1),
(2) Date: May 16, 2019

(87) PCT Pub. No.: WO2018/091631
PCT Pub. Date: May 24, 2018

(65) Prior Publication Data
US 2019/0353590 A1 Nov. 21, 2019

(30) Foreign Application Priority Data
Nov. 18, 2016 (FR) ...................................... 1661235

(51) Int. Cl.
*G01N 21/55* (2014.01)
*G01N 21/27* (2006.01)
(Continued)

(52) U.S. Cl.
CPC ........... *G01N 21/55* (2013.01); *G01N 21/274* (2013.01); *G01N 21/3563* (2013.01);
(Continued)

(58) Field of Classification Search
CPC .. G01N 21/55; G01N 21/274; G01N 21/3563; G01N 2021/1757;
(Continued)

(56) References Cited

U.S. PATENT DOCUMENTS 4,492,867 A * 1/1985 Laarhoven ............. G01N 21/95
250/339.09
5,962,853 A 10/1999 Huth-Fehre et al.
(Continued)

FOREIGN PATENT DOCUMENTS

CA 2743739 A1 5/2010
CN 1524178 A 8/2004
(Continued)

OTHER PUBLICATIONS

International Search Report for PCT/EP2017/079543, dated Feb. 23, 2018.

*Primary Examiner* — Blake C Riddick
(74) *Attorney, Agent, or Firm* — Lerner, David, Littenberg, Krumholz & Mentlik, LLP

(57) ABSTRACT

The invention relates to a portable device for estimating at least one parameter characteristic of a polymer material, characterized in that the device comprises at least one infrared source, each infrared source being capable of emitting towards the polymer material a spectral line, representing maximum emission energy, selected in one of the wavelengths 10 µm, 9.5 µm, 7.2 µm, 6 µm, 3.5 µm, 2.7 µm or in one of the wave numbers 1,000 cm$^{-1}$, 1,050 cm$^{-1}$, 1,350 cm$^{-1}$, 1,700 cm$^{-1}$, 2,900 cm$^{-1}$, 3,700 cm$^{-1}$, at least one infrared detector, capable of receiving infrared radiation, which is reflected by the polymer material in response to the spectral line, a unit for determining the parameter characteristic of the polymer material as a function of the energy present in said spectral line in the infrared radiation, (Continued)

Figure 2:
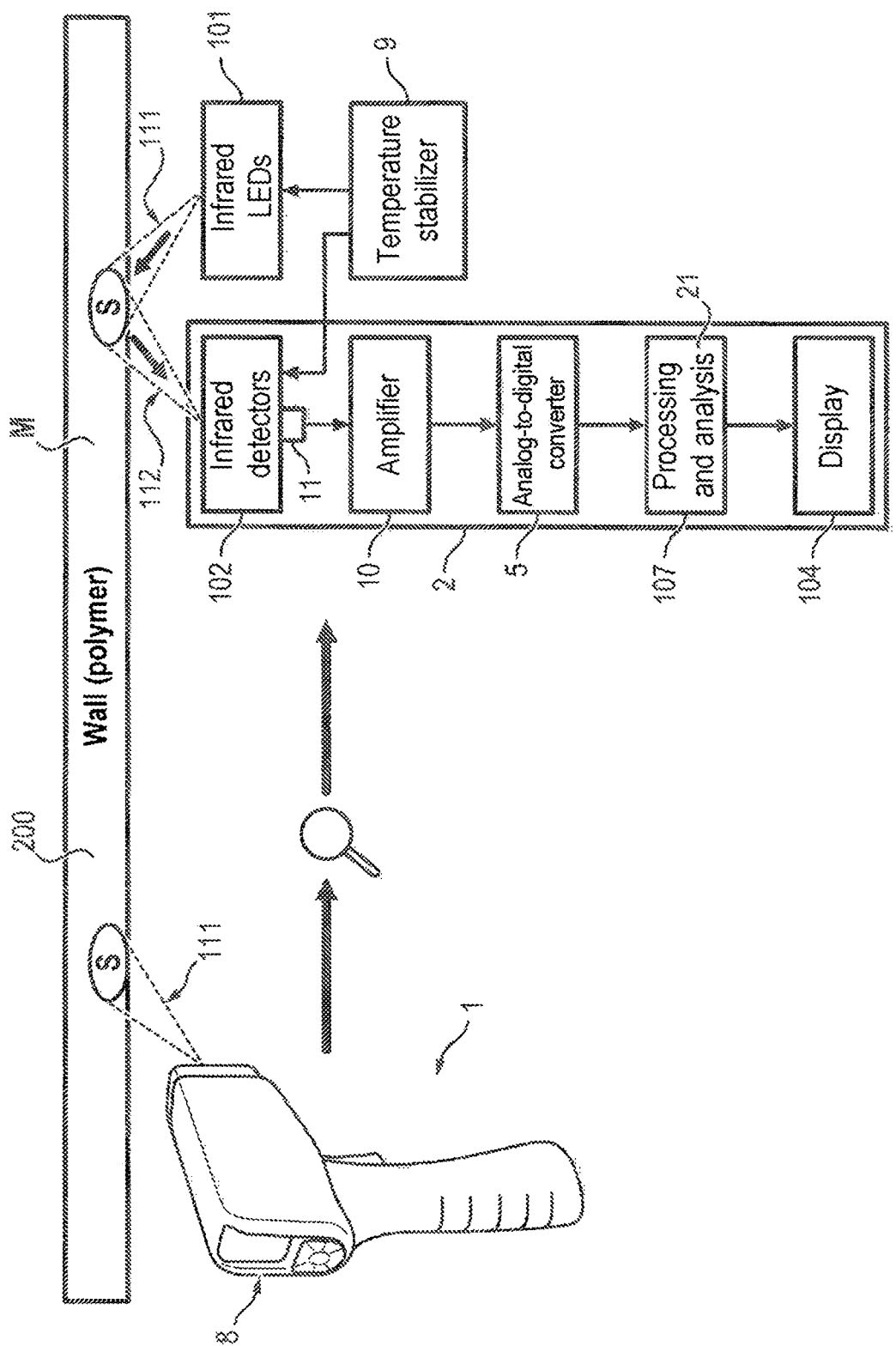

having been reflected by the polymer material and having been received by the infrared detector.

23 Claims, 6 Drawing Sheets

(51) Int. Cl.
  *G01N 21/3563* (2014.01)
  *G01N 21/84* (2006.01)
  *G01N 21/17* (2006.01)
  *G01N 21/31* (2006.01)
(52) U.S. Cl.
  CPC . *G01N 21/8422* (2013.01); *G01N 2021/1757* (2013.01); *G01N 2021/3133* (2013.01); *G01N 2021/8427* (2013.01); *G01N 2201/0221* (2013.01)
(58) Field of Classification Search
  CPC ... G01N 2021/3133; G01N 2201/0221; G01N 21/8422; G01N 2021/8427
  See application file for complete search history.

(56) References Cited

U.S. PATENT DOCUMENTS

| | | | |
|---|---|---|---|
| 6,172,743 | B1 | 1/2001 | Kley et al. |
| 6,818,892 | B1 | 11/2004 | Etienne et al. |
| 6,943,353 | B2 | 9/2005 | Elmore et al. |
| 2003/0175160 | A1 | 9/2003 | Archibald et al. |
| 2003/0183766 | A1* | 10/2003 | Hodgkinson ...... G01N 21/3518 250/343 |
| 2004/0149911 | A1 | 8/2004 | Irie et al. |
| 2004/0195511 | A1 | 10/2004 | Elmore et al. |
| 2005/0067569 | A1 | 3/2005 | Shelley et al. |
| 2007/0259440 | A1* | 11/2007 | Zhou ................ G01N 33/0047 436/141 |
| 2008/0224034 | A1 | 9/2008 | Wollstein et al. |
| 2008/0266549 | A1* | 10/2008 | Schiedemeyer ..... G01N 21/359 356/73 |
| 2009/0321647 | A1* | 12/2009 | Shelley ................. G01N 21/84 250/339.07 |
| 2010/0140476 | A1* | 6/2010 | Werner ............. G01N 21/3563 250/339.07 |
| 2012/0213246 | A1 | 8/2012 | Honbo et al. |
| 2016/0178528 | A1 | 6/2016 | Weimer et al. |
| 2017/0336264 | A1* | 11/2017 | Chanda ............ G01N 21/3563 |
| 2018/0059015 | A1* | 3/2018 | Li ........................ G01N 21/359 |

FOREIGN PATENT DOCUMENTS

| | | |
|---|---|---|
| CN | 101278323 A | 10/2008 |
| CN | 103743695 A | 4/2014 |
| CN | 205506680 U | 8/2016 |
| DE | 19506550 A1 | 8/1996 |
| EP | 2138830 A2 | 12/2009 |
| JP | 2001242078 A | 9/2001 |
| JP | 2002233441 A | 8/2002 |
| JP | 2005043240 A | 2/2005 |
| JP | 2006090765 A | 4/2006 |
| JP | 2007225326 A | 9/2007 |
| JP | 2015206751 A | 11/2015 |
| WO | 2005050178 A1 | 6/2005 |
| WO | 2014174664 A1 | 10/2014 |

* cited by examiner

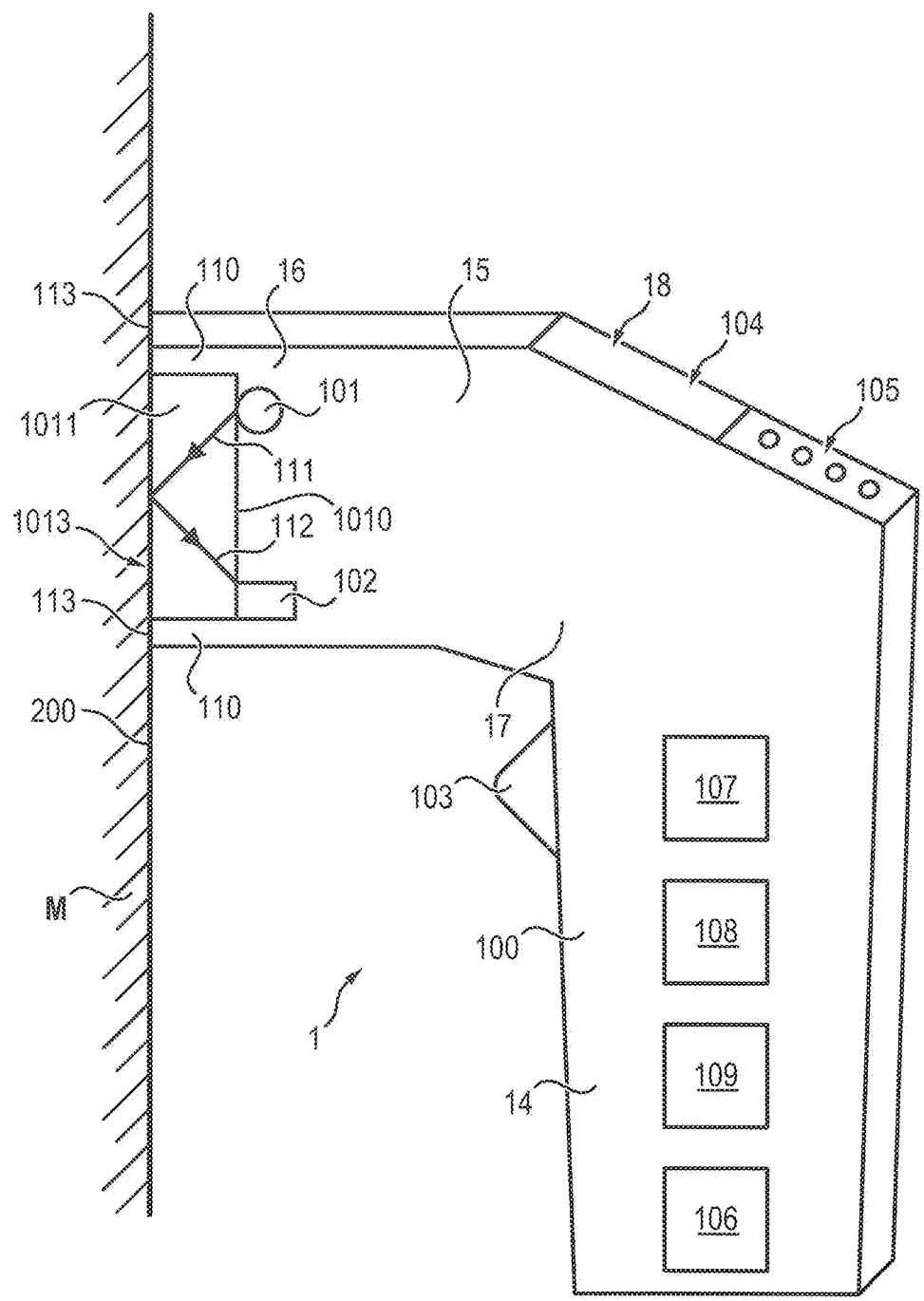
FIG. 1-a

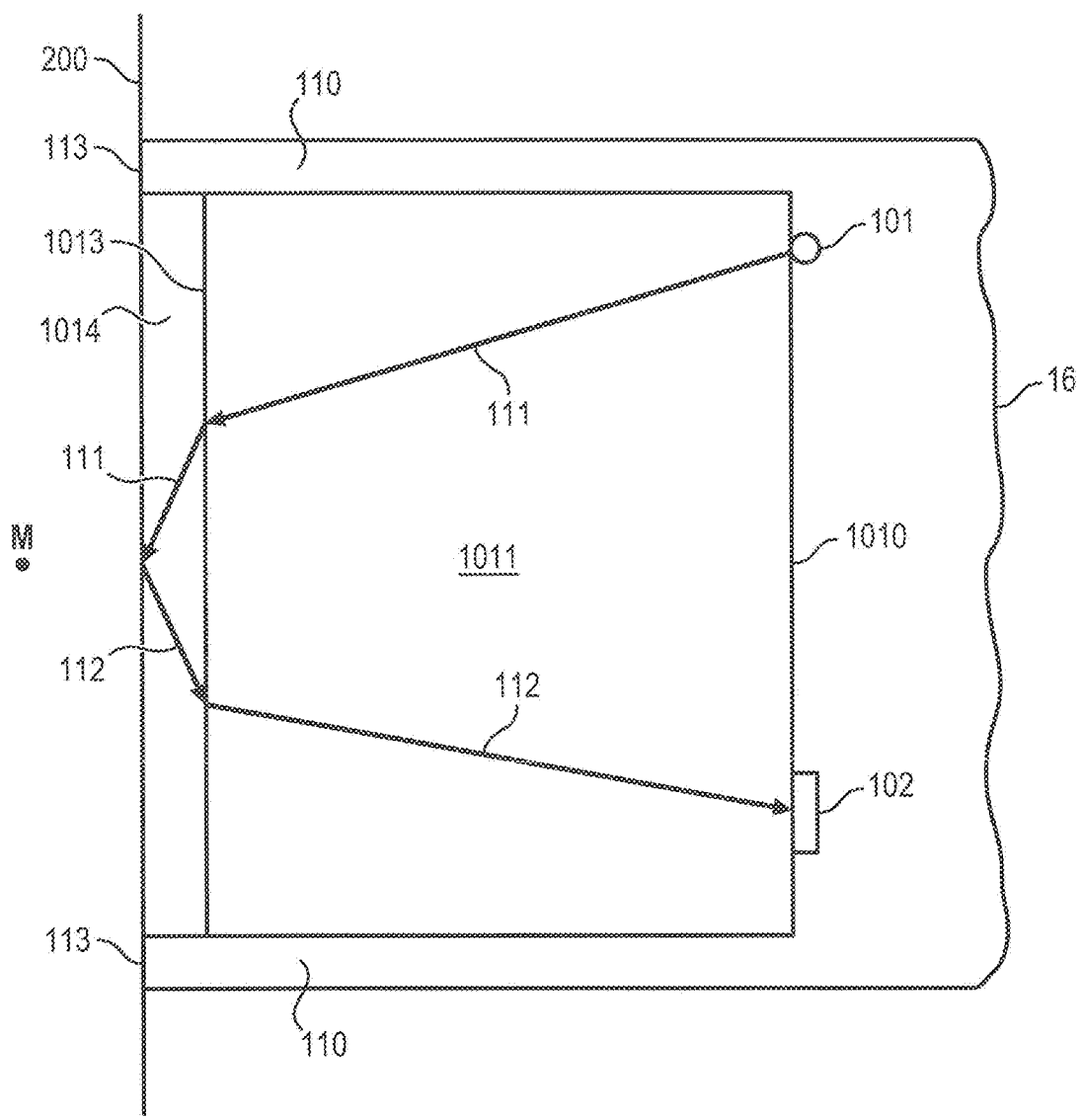
FIG. 1-b

PORTABLE DEVICE AND METHOD FOR ESTIMATING A PARAMETER OF A POLYMER

CROSS-REFERENCE TO RELATED APPLICATIONS

The present application is a national phase entry under 35 U.S.C. § 371 of International Application No. PCT/EP2017/079543, filed Nov. 17, 2017, which claims priority from French Patent Application No. 1661235, filed Nov. 18, 2016, all of which are incorporated herein by reference.

The invention relates to a device for estimating a parameter of a polymer material.

A field of application of the invention relates to the polymers serving as coating on walls or pipework, especially in nuclear power plants for electricity production.

The present invention relates to measuring one or more parameters on materials which can be, in a non-limiting way:

polymer coatings, typically paints constituting paints,
components of polymer such as for example conduits for transporting fluid,
electric cables.

Such paints or components are common in the industrial environment, for example nuclear power production sites where there are severe temperatures and humidity conditions which these paints and components have to resist. In the safety rule applicable to nuclear power plants, it is required for sealing properties of surface coatings such as polymer paints applied to internal concrete walls forming the enclosures of reactor buildings to resist severe temperature and humidity conditions. Delaminating or peeling of such coatings can result in obstructing and clogging the emergency sprinkler circuit known by the acronym EAS injecting water by sprinkling in droplets inside the enclosure of the reactor building for example during operational tests or in case of accident resulting in release of hot water causing a substantial rise in pressure and temperature inside the enclosure originating in peeling of coatings, a situation for which the emergency system EAS is dimensioned.

These demands relate more generally to all materials based on polymer, for example so-called high-density polymer tubes or conduits, where circulating fluids can be at high temperatures. Here, pertinent checking must be done on the inner surface of said tube. Another example where monitoring is required is that of electric cables, also of polymer composition, where degradation is synonymous loss of electrical insulation.

The demands according to the regulatory and safety standards specific to each industry require the operator to monitor the state of surface coatings, such as paints and some components such as the conduits and cables. Since they have a polymer structure, an adapted control method must be implemented.

In the case for example of coatings applied to a nuclear power plant, on the inner walls of the buildings of the nuclear power plants having to ensure a sealing function, it is well known that visual checks fail to estimate as parameter a real state of ageing such as for example cracking or blistering, with respect to the criterion sought. In fact, either cracking or blistering appear and advanced degradation diagnosis is immediately declared, or none of these symptoms appears and the operator cannot judge. Even if no degradation is visible to the naked eye, it can be that the latter has already started inside the microstructure of the thin layer of the coating, a sign of deterioration, synonymous with a loss in protective characteristics such as sealing. In these conditions, it is shown that, even though of healthy appearance, the coating will not resist the ordeal of a substantial transient rise in temperature and humidity, which can delaminate coatings applied to also constitute detrimental waste for the operator.

The challenge is therefore to anticipate such situations by way of pertinent evaluation of a state of ageing, even before the appearance of initial embrittlement.

In this way, the operator looks for a method for measuring degradations, which anticipates the need for maintenance with respect to previously defined degradation criteria and a previously set maintenance program.

It is known, for controlling coatings, to produce model briquettes during the paint production phase. The model briquettes are painted by the polymer coating, then kept in cabinets inside the relevant building. This method is based on the hypothesis that ageing of the briquettes will be representative of the ageing of protective coatings. In a programmed manner the model briquettes are controlled in an analysis laboratory. This involves regular transport (out and back) of the model briquettes between their conservation placement and the analysis laboratory. There are several disadvantages:

The briquettes are sometimes lost or damaged during transport. A core sampling in the concrete of a wall for example of a building of a nuclear power plant is necessary for replacing the model briquettes. This operation requires fairly substantial maintenance actions as the holes created by the core sampling must be refilled and repainted.

The state of ageing of the coating of the briquettes is not totally representative of that of the entire building.

Also, another problem can be having to check that a determined polymer is present. For example, in the environment indicated hereinabove, the aim can be to check that the product forming for example a joint does constitute a polymer material specified in a specification, in buildings of reactors in the environment indicated hereinabove or in other environments, and more generally other buildings of an industrial character in also various environments.

The present invention aims to eliminate the disadvantages of the prior art and resolve the problem indicated hereinabove for estimating a parameter of a polymer material by a device and a method which must be simple to execute and adapted to systematically detect an ageing tracer of the polymer material.

For this purpose, a first object of the invention is a device for estimating at least one parameter of a polymer material, characterized in that the device comprises:

at least one infrared source, capable of emitting towards the polymer material first infrared radiation, having at least one spectral line of emission having at least one prescribed wavelength, corresponding to detection of at least one ageing tracer of the polymer material, at least one infrared detector, capable of receiving second infrared radiation, which is reflected by the polymer material in response to emitting of the first infrared radiation, a unit for determining the parameter of the polymer material as a function of the at least one line having the prescribed wavelength in the second infrared radiation.

According to an embodiment, a portable device for estimating at least one parameter characteristic of a polymer material is provided, characterized in that the device comprises:

at least one infrared source,
each infrared source being capable of emitting towards the polymer material a spectral line, representing maximum emission energy, selected in one of the wavelengths 10 µm, 9.5 µm, 7.2 µm, 6 µm, 3.5 µm, 2.7 µm or in one of the wave numbers 1,000 cm$^{-1}$, 1,050 cm$^{-1}$, 1,350 cm$^{-1}$, 1,700 cm$^{-1}$, 2,900 cm$^{-1}$, 3,700 cm$^{-1}$, at least one infrared detector, capable of receiving infrared radiation, which is reflected by the polymer material in response to the spectral line, having been emitted by the at least one infrared source, a determination unit for determining the parameter characteristic of the polymer material as a function of the energy present in said spectral line, in the infrared radiation, having been reflected by the polymer material and having been received by the infrared detector.

The values of wavelength and number of waves selected, are those which have been determined by the inventors as corresponding to detection of an ageing tracer of the polymer material by emission of a line whereof the maximum energy is located in one of these values.

The invention thus enables to determine a parameter of the polymer depending on detection of the ageing tracer, and this by means of a portable device which is simple to execute.

The device according to the invention thus avoids irradiating the polymer material by all the wavelengths of the infrared spectrum, but irradiates it by only a line of interest located in the one or more of the above wavelengths or wave numbers, by avoiding having to select by a spectrometer one or more wavelengths received by the infrared detector.

According to an embodiment, there can be several infrared sources.

According to an embodiment, there can be several spectral lines.

According to an embodiment, each infrared source is capable of emitting towards the polymer material a unique spectral line, indicated hereinabove. Hereinbelow, infrared radiation, having been reflected by the polymer material and having been received by the infrared detector in response to the emission of the above spectral line(s) by the infrared source(s) is also called second infrared radiation.

According to an embodiment, the spectral line is narrow-band of emission.

According to an embodiment, the parameter characteristic of the polymer material is the presence and/or content of at least one ageing tracer in the polymer material.

According to an embodiment, the parameter characteristic of the polymer material is an identification of the polymer.

According to an embodiment, each infrared source is capable of emitting towards the polymer material the spectral line in the form of one or more time pulses.

According to an embodiment, the time pulse(s) are rectangular.

According to an embodiment, control means are provided for starting the at least one infrared detector synchronously with the time pulse(s).

According to an embodiment, the device comprises a control means for taking several first measurements of the infrared radiation over a first prescribed time width comprised in or equal to a respective time width of at least one of the pulses, to calculate an estimation of a first value representative of the first measurements, the parameter being calculated from at least the first value.

According to an embodiment, the device comprises a control means for taking several second measurements of the second infrared radiation over a second prescribed time width comprised in or equal to a respective time width between two successive pulses, to calculate an estimation of a second value representative of the second measurements, the parameter being calculated at least from the difference between the first value and the second value.

According to an embodiment, the device further comprises at least one manual control member for triggering the emission of the spectral line by the at least one infrared source.

According to an embodiment, the at least one infrared source is at least one infrared light-emitting diode or at least one laser source.

According to an embodiment, the at least one infrared detector is of photodiode or photoconductor type and is capable of generating an electrical photocurrent as a function of the infrared radiation which it receives.

According to an embodiment, it is provided as infrared source at least two infrared sources, which are capable of emitting towards the polymer material respectively two different spectral lines, each representing a maximum emission energy, selected in respectively two different of the wavelengths 10 µm, 9.5 µm, 7.2 µm, 6 µm, 3.5 µm, 2.7 µm or in respectively two different of the wave numbers 1,000 cm$^{-1}$, 1,050 cm$^{-1}$, 1,350 cm$^{-1}$, 1,700 cm$^{-1}$, 2,900 cm$^{-1}$, 3,700 cm$^{-1}$.

According to an embodiment, the width at half height of the spectral line of the at least one infrared source is less than or equal to 1 µm.

According to an embodiment, the unit for determining the parameter characteristic of the polymer material comprises at least one filter or circuit or filtering unit for suppression or attenuation of a continuous component in a signal, having been provided by the infrared detector from the infrared radiation.

According to an embodiment, the unit for determining the parameter characteristic of the polymer material comprises an amplifier for amplifying the filtered signal downstream from the filter or circuit or filtering unit, an analog-to-digital converter downstream from the amplifier and means for processing and storing data, to determine the parameter characteristic of the polymer material from the digital signal(s) provided by the analog-to-digital converter.

According to an embodiment of the invention, the determination unit is configured to calculate the parameter characteristic of the polymer material as a function at least of the amplitude of a detection signal obtained from the infrared detector and from the infrared radiation received at the at least one wavelength corresponding to the at least one spectral line.

According to an embodiment of the invention, the determination unit is configured to calculate the parameter characteristic of the polymer material as a function of the amplitude of a detection signal obtained from the infrared detector and from the infrared radiation received at the at least one wavelength corresponding to the at least one line, relative to the amplitude of an emission signal serving to control the at least one infrared source to emit the at least one spectral line.

According to an embodiment of the invention, the device comprises a cooling module, for cooling the at least one infrared detector and/or a cooling module, for cooling the at least one infrared source.

According to an embodiment of the invention, the device comprises a thermostat and an electronic unit for automatic temperature stabilization which is connected to the cooling module, for maintaining the at least one infrared detector and/or the at least one infrared source at a temperature prescribed by the thermostat.

According to an embodiment of the invention, the device has the shape of a pistol comprising a grip handle attached to a sighting module comprising at a front end away from the handle the at least one infrared source and the at least one infrared detector, the pistol comprising at least one manual control member for triggering emission of the at least one spectral line by the at least one infrared source, wherein the manual control member is located near a zone of the pistol connecting the handle to the sighting module.

According to an embodiment of the invention, the at least one source and/or the at least one infrared detector are covered by at least one external block, the at least one source being capable of emitting the at least one spectral line and the at least one infrared detector being capable of receiving said infrared radiation through the external block which is transparent to the latter and which is turned towards the polymer material.

According to an embodiment of the invention, the device comprises a support guard against the polymer material, the external block having an external distal surface, which is at the same time oriented towards the polymer material and which is retracted relative to an external distal surface of the guard, also turned towards the surface of the polymer material.

A second object of the invention is a method for estimating at least one parameter of a polymer material, characterized in that first infrared radiation characterized by at least one spectral line of emission having at least one prescribed wavelength, corresponding to the detection of the at least one ageing tracer of the polymer material, is sent by at least one infrared source towards the polymer material, second infrared radiation, which is reflected by the polymer material in response to the sending of the first infrared radiation, is received by at least one infrared detector, the parameter of the polymer material is determined by a determination unit as a function of the at least one spectral line of prescribed wavelength in the second infrared radiation.

According to an embodiment of the invention, there is provided a method for estimating at least one parameter characteristic of a polymer material, characterized in that at least one spectral line of emission, representing maximum emission energy, selected in at least one of the wavelengths 10 µm, 9.5 µm, 7.2 µm, 6 µm, 3.5 µm, 2.7 µm or in one of the wave numbers 1,000 $cm^{-1}$, 1,050 $cm^{-1}$, 1,350 $cm^{-1}$, 1,700 $cm^{-1}$, 2,900 $cm^{-1}$, 3,700 $cm^{-1}$, is emitted by at least one infrared source towards the polymer material, infrared radiation, which is reflected by the polymer material in response to the spectral line having been emitted by the at least one infrared source, is received by at least one infrared detector, the parameter characteristic of the polymer material is determined by a determination unit as a function of the energy present in said at least one spectral line in the second infrared radiation, having been reflected by the polymer material and having been received by the infrared detector.

Figure 3:
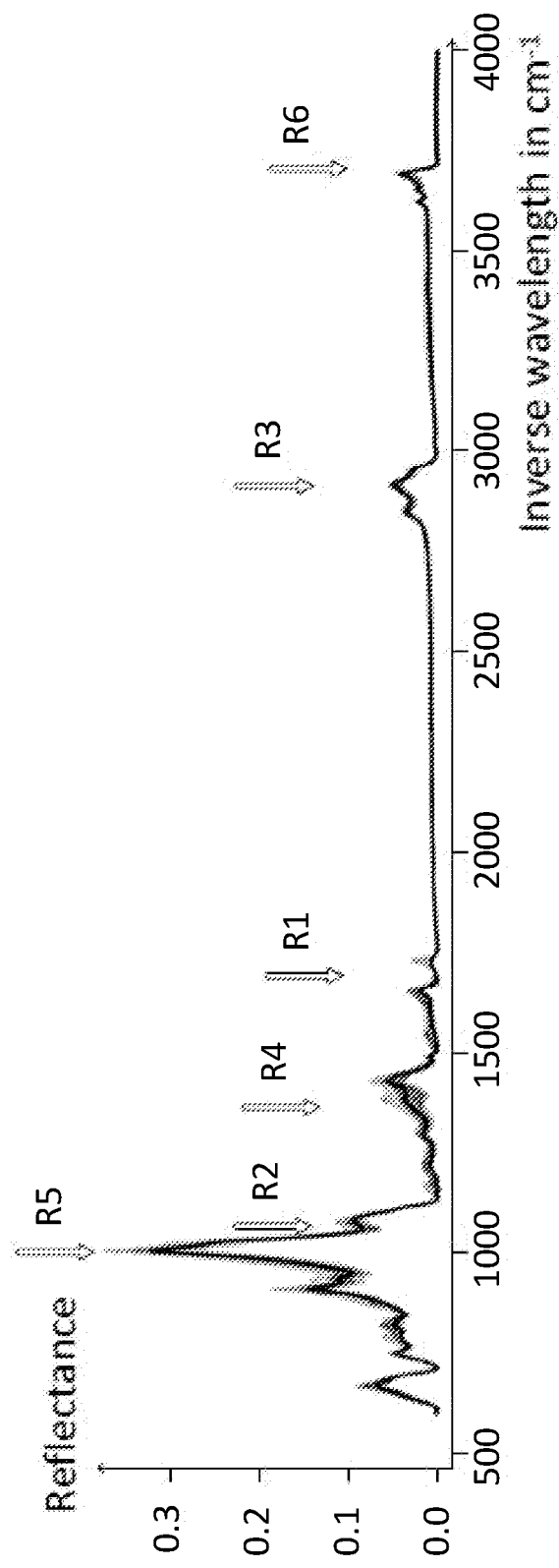
Figure 4:
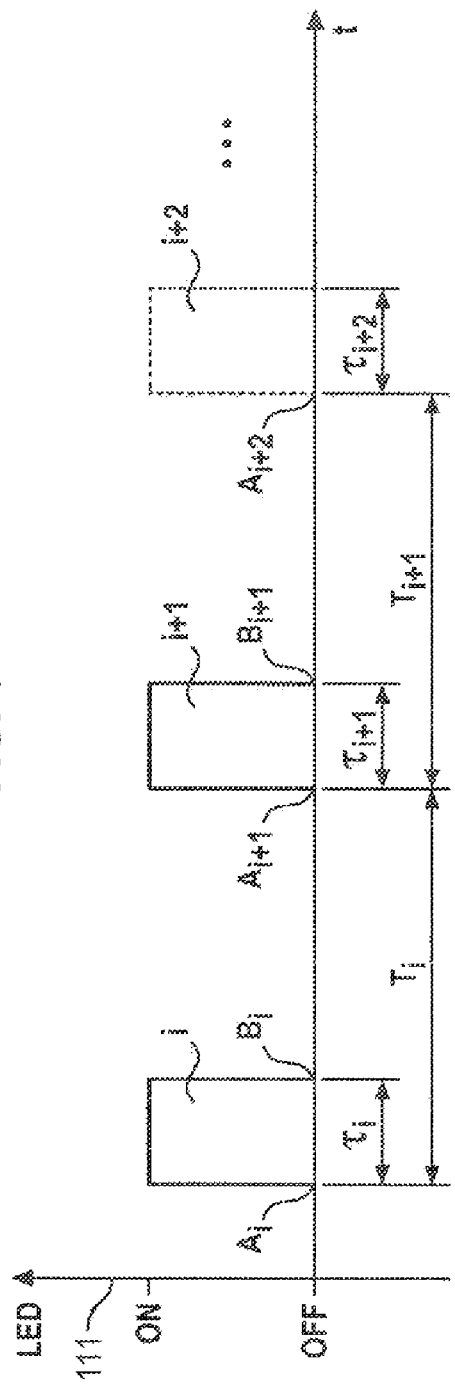
Figure 5:
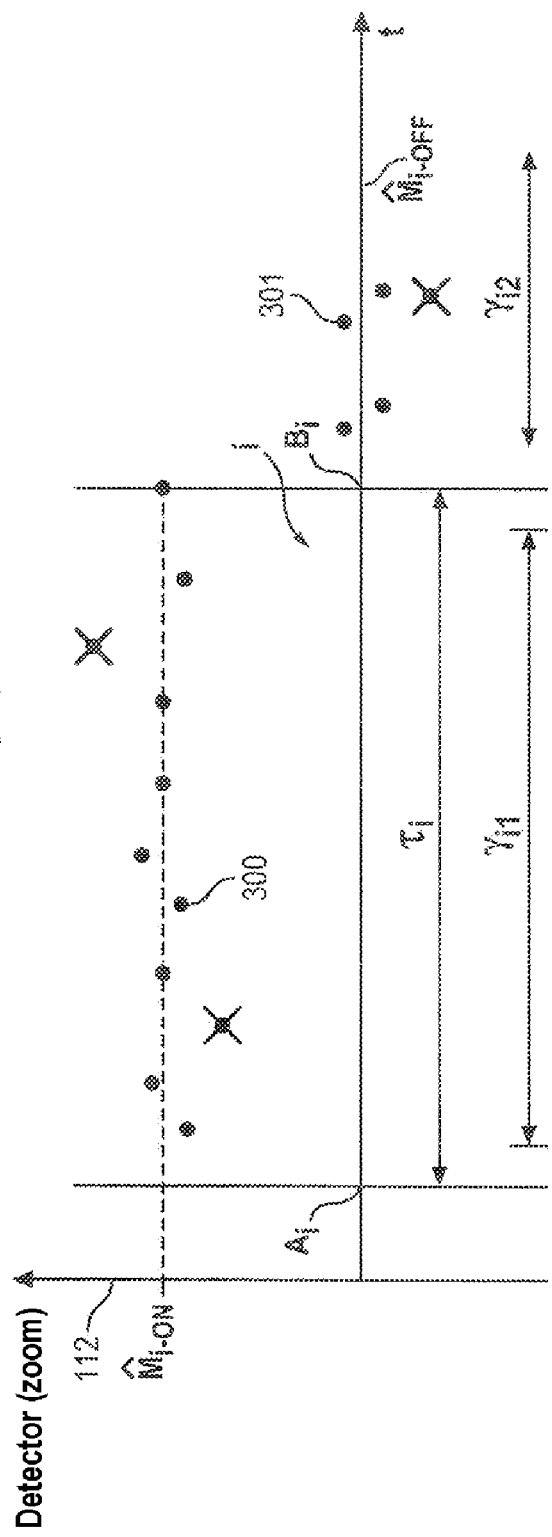
Figure 6:
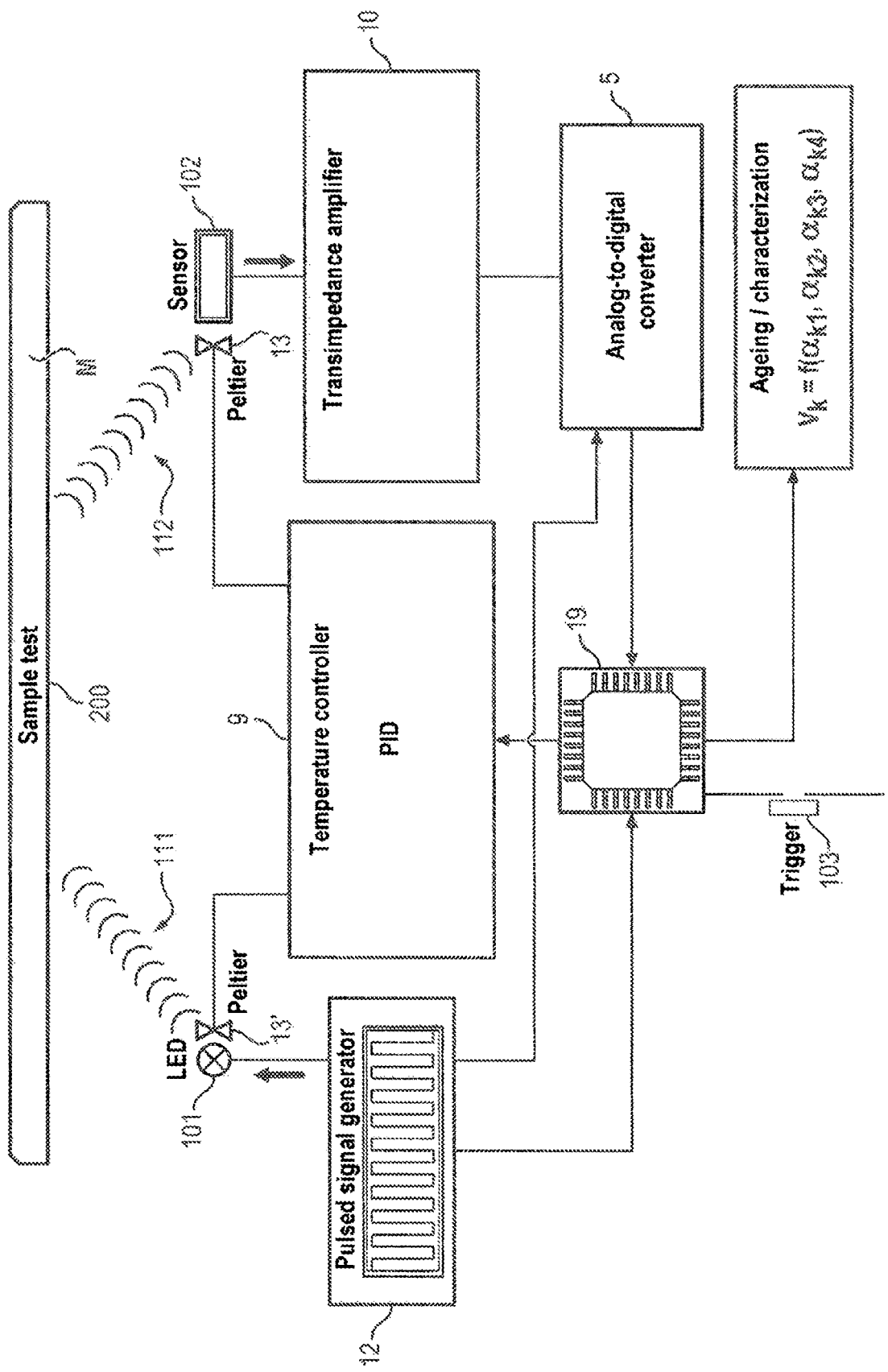

The invention will be better understood on reading the following description given solely by way of nonlimiting example in reference to the appended drawings, in which:

FIG. 1-a illustrates a general block diagram of the estimation device according to an embodiment of the invention, FIG. 1-b illustrates a part of the estimation device according to an embodiment of the invention, FIG. 2 is a block diagram of a part for acquiring the measurements of the estimation device according to an embodiment of the invention, FIG. 3 illustrates the variations of the infrared spectral reflectance of a polymer, as a function of the inverse of the wavelength in abscissa, FIG. 4 illustrates a chronogram of a signal for controlling an infrared source of the estimation device according to an embodiment of the invention, FIG. 5 illustrates a chronogram of measurements taken by the infrared detector of the estimation device according to an embodiment of the invention, FIG. 6 is a block diagram of the estimation device according to an embodiment of the invention.

Embodiments of the device 1 for estimating a parameter of a polymer material M and of a method for estimating a parameter of a polymer material M implemented by means of this device 1 are described hereinbelow. This parameter can be the presence of at least one ageing tracer and/or the content of at least one ageing tracer and/or the identification of the polymer material M.

In the figures, the device 1 for estimating the parameter comprises one or more infrared sources 101, one or more infrared detectors 102 and a unit 2 for determining the parameter.

In general, according to the invention, the infrared source(s) 101 send towards the polymer material M first infrared radiation 111 having one or more spectral line of emission of prescribed wavelengths, corresponding to detection of at least one ageing tracer of the polymer material.

According to an embodiment, each infrared source has a narrow band of emission wavelength containing the prescribed wavelength, so-called of interest or also interest peak, corresponding to the ageing tracer of the polymer material M.

According to an embodiment, the infrared source emits only in at least one spectral region of emission (or band) containing the spectral line of emission or around the spectral line of emission having the prescribed wavelength of infrared radiation corresponding to the detection of the ageing tracer of the polymer material M.

According to an embodiment, the infrared source 101 is an infrared light-emitting diode. Such a diode emits in the above spectral region of emission, located about the above line. This spectral region of emission can be for example represented by a Gaussian centered on the spectral line corresponding to the maximum energy emitted. The diode can therefore be characterized by the line and the band in which the line is located.

According to another embodiment, the infrared source 101 is a laser source. Such a laser source is substantially monochromatic. In this case, the source emits at the prescribed wavelength only, or in a spectral region of emission of substantially zero width around the above line.

According to an embodiment, the device 1 can comprise a surface 1010 in which or below which is/are the source(s) 101 and/or the infrared detector(s) 102 and which is intended to be turned towards the polymer material M to be tested. In an embodiment, the source(s) 101 and/or the infrared detector(s) 102 are covered by at least one external block 1011, which is transparent to the first and second infrared radiation 111 and 112 and disposed such that the distal face 1013 of the external block is close to the surface 200 of the polymer material M without being in contact with the latter. This external block 1011 transmits the radiation 111 of the infrared source(s) 101 towards the material M and of the material M towards the infrared detector(s) without alterations, other than modifications to trajectories of the first and second infrared radiation 111 and 112 due to refraction according to the law of the geometric optic as shown in FIG. 1-*b* for this embodiment. The thin volume 1014 left vacant between the distal face 1013 and the surface 200 of the polymer material M limits perturbations caused by the presence of air on the measurement by interacting with the infrared radiation 111 and/or 112 and avoids the oxygen contained in the air from attenuating the radiation by absorption having specific wavelengths. This block can be made for example of germanium.

The infrared detector(s) 102 are configured to receive second infrared radiation 112, which is reflected by the polymer material M (by the surface 200 of the latter) in response to sending the first infrared radiation 111 coming from the infrared source(s) 101.

The device 1 comprises a unit 2 for determining the parameter of the polymer material M as a function of the at least one spectral line of emission having the prescribed wavelength in the second infrared radiation 112.

In the case of the at least one spectral region of emission (or band) containing the spectral line of emission or around the spectral line of emission, such as for example in the case of a diode as source 101, and in the absence of any other source of radiation, the energy of the second radiation is comprised in the band associated with the diode which executes the emission. The infrared detector 102 does not know the concept of band but integrates only the energy coming from the source, such as the diode for example. A reception band is therefore created.

According to an embodiment, the unit 2 determines the parameter of the polymer material M as a function of the presence and/or of the amplitude of a second signal obtained from the infrared detector 102 and from the second infrared radiation 112 at the prescribed wavelength(s) corresponding to the spectral line(s).

The determination unit 2 can be configured to calculate the parameter of the polymer material M as a function of the ratio calculated from the amplitude of the second signal obtained from the infrared detector 102 and from the second infrared radiation 112 at the at least one prescribed wavelength corresponding to the at least one spectral line, divided by the amplitude of a first signal serving to control the at least one infrared source 101 for sending the first infrared radiation 111 having the at least one spectral line at the at least one prescribed wavelength.

According to an embodiment of the invention, the at least one spectral line R1, R2, R3, R4, R5, R6 of prescribed wavelength is selected in the wavelength interval ranging from 2 µm to 10 µm, i.e., in the wave number interval ranging from 1,000 cm$^{-1}$ to 5000 cm$^{-1}$. According to an embodiment of the invention, the width at half height of the at least one spectral region B1, B2, B3, B4, B5, B6 of emission containing the at least one line R1, R2, R3, R4, R5, R6 of prescribed wavelength is less than or equal to 1 µm. According to an embodiment of the invention, the width at half height (FWM) of the at least one spectral region B1, B2, B3, B4, B5, B6 of emission containing the at least one line R1, R2, R3, R4, R5, R6 of prescribed wavelength is greater than or equal to 0.2 µm and less than or equal to 1 µm. For example, this width at half height of the at least one spectral region B1, B2, B3, B4, B5, B6 of emission containing the at least one line R1, R2, R3, R4, R5, R6 of prescribed wavelength can be equal to 0.2 µm.

According to an embodiment of the invention, the at least one spectral line R1, R2, R3, R4, R5, R6 of prescribed wavelength is selected in at least one of the wavelengths described hereinbelow, especially at 6 µm and/or 9.5 µm and/or at 3.5 µm and/or 7.2 µm and/or at 10 µm and/or at 2.7 µm, respectively, corresponding respectively to lines of interest R1, R2, R3, R4, R5, R6 for determining a parameter of the polymer material M.

According to an embodiment, in the event where the parameter is the presence of an ageing tracer and/or the content of at least one ageing tracer, this presence and/or this content are determined from the line(s) R1, R2, R3, R4, R5, R6 at the prescribed wavelength(s) in the second infrared radiation 112, and optionally the infrared spectral band of emission(s) B1, B2, B3, B4, B5, B6 around respectively the line(s) R1, R2, R3, R4, R5, R6.

In the event where the parameter is the identification of the polymer material M, the unit 2 can also comprise comparison means for comparing the at least one spectral band (B1, B2, B3, B4, B5, B6) of emission around the line(s) (R1, R2, R3, R4, R5, R6) of prescribed wavelength in the second infrared radiation 112 to at least one prerecorded spectral signature of at least one predetermined polymer, for identifying the polymer material M relative to said predetermined polymer.

In the event where the parameter is the identification of the polymer material M, the unit 2 also comprises comparison means for comparing on the one hand the detection signal of the infrared detector(s) 112 (or response(s) of the infrared detector(s)), obtained from the second infrared radiation 112, in the band(s) around the line(s) at the prescribed wavelength(s) (for example in amplitude of the detection signal and prescribed wavelength(s), on the other hand to one or more characteristic values (amplitude of the detection signal and prescribed wavelength(s)) of the spectral line(s) or spectral signatures, which have been pre-recorded in a memory of the unit 2 and which have been predetermined for one or more polymer material(s) having one or more known identification(s) (composition for example), to determine if the spectral line(s) of the second infrared radiation 112 correspond to the characteristic values or the spectral signatures of known identifications.

In the text the values given in µm are wavelengths, each comprised in an emission band of infrared radiation, the values given in cm$^{-1}$ are wave numbers defined as the inverse of a wavelength and more used by chemists, the first being more used by manufacturers of optic, optoelectronic materials. Similarly, usage of the word line expressed by R will correspond to a spectral line of wavelength dimensioned in µm emitted in an emission band B of infrared radiation, usage of the word peak or peak of interest expressed by P will correspond to a spectral peak of wave number dimensioned in cm$^{-1}$ characteristic of a component of interest of a polymer material M.

The estimation device 1 can be used for all polymers (especially paints, neoprenes, electric cables, etc.). In particular the spectral line at 6 µm corresponds to the oxidation of all polymers which is disclosed via the carbonyl. In fact, the carbonyl manifests towards about 1,700 cm$^{-1}$ forming a corresponding peak of interest P1 in what follows at a first line R1 of prescribed wavelength at about 6 µm comprised in its emission band B1. But, for example the ageing of neoprenes is also due to other causes (its load degrades) which manifest between about 1,000 cm$^{-1}$ and about 1100 cm$^{-1}$ and this is seen via a second line R2 of prescribed wavelength at about 9.5 µm, or 1,050 cm$^{-1}$ forming a peak of interest P2. A third line R3 is located at a prescribed wavelength at about 3.5 µm, corresponding to a peak of interest P3 located at about 2,900 cm$^{-1}$. Beyond the 3000 cm$^{-1}$, other causes of ageing are observed, applicable to different modes of ageing of all, or of some polymers. There is for example a spectral line of prescribed wavelength with its band associated by ageing mode.

For example, the concentration of carbonyl is an ageing tracer which can be determined by way of the Beer-Lambert law. This physical parameter, which will play a role of ageing tracer, is directly responsible for oxidative degradation.

Irrespective of the type of component or epoxide coating, since it has a polymer structure, the generation of the first ageing events occurs on the scale of the structure of the material, at the molecular level. Experiments have shown that analysis of infrared reflectance spectra, according to statistical processing by functional boxplot which graphically illustrates the statistical curves of infrared reflectance (density of presence in ordinates) according to FIG. 3, has disclosed peaks of interest where the deterioration of polymers appears.

The functional boxplot method is a statistical method deriving from the boxplot, applicable to functions and not to a set of scalars.

These peaks are made to correspond to lines at infrared frequencies where the statistical dispersion of the curves obtained by functional boxplot is wide, especially towards the peak P2 at about 1,050 $cm^{-1}$ and the peak P4 at about 1,350 $cm^{-1}$ corresponding to the second spectral line R2 and to a fourth spectral line R4 respectively of prescribed wavelength at about 9.5 μm and 7.2 μm respectively. The detector 102 placed in these regions of the spectrum characterizes ageing. According to an embodiment, each peak of interest or line of interest corresponds to a spectral region containing information pertinent for detection of the ageing tracer and for estimation of the parameter. This pertinent information was able to be found by statistical analysis via the functional boxplot method.

In the case of polymers, analysis refers to the spectrum of reflectance after emission of IR wave in the band of the mid-infrared; it is from this reflectance that the singularities are observed after statistical analysis.

FIG. 3 illustrates an example of functional boxplot. It illustrates the variations in reflectance of the infrared radiation 111, 112 in ordinates as a function of the inverse of the wavelength in abscissa in $cm^{-1}$. FIG. 3 shows the quartiles of the density function, specifically:

1) In black, the median curve,
2) In dark grey, all the curves between the functional quartiles 25% and 75%, or 50% of the central data,
3) In light grey, all the curves between 5% and 95%, or the limits of the data without outliers.

In this FIG. 3, the outliers are not shown.

Therefore FIG. 3 shows, marked by arrows, the lines R1, R2, R3, R4, R5, R6 corresponding to peaks of interest. In particular, FIG. 3 shows the fifth spectral line R5 at about a fifth peak P5 of interest at 1,000 $cm^{-1}$, corresponding to a prescribed wavelength of about 10 μm, and the second spectral line R2 at about the second peak of interest P2 at about 1,050 $cm^{-1}$ corresponding to a prescribed wavelength of about 9.5 μm correspondent to the peaks of the silica and to that of hydrolyzed silica respectively, and the sixth spectral line R6 at about a sixth peak P6 of interest at about 3,700 $cm^{-1}$, corresponding to a prescribed wavelength of about 2.7 μm.

The statistical method mentioned hereinabove has determined a distribution function for all the reflectances in several of the or all of the above wavelengths or above wave number. So according to an embodiment at least two different spectral lines of wavelength or different wave number are used, coming from two separate infrared sources. This overcomes dispersions in measurements, which can be due to the surface state of the polymer material. This more effectively detect the degree of ageing and/or identification of the polymer material.

According to an embodiment, an infrared source is characterized by a spectral band B where emission occurs, this band being about a spectral line R where the energy of the emission is generally maximum.

The spectral band emitted by the infrared source(s) can be selected around one or more of the spectral lines R1, R2, R3, R4, R5, R6. In particular, at least two separate spectral lines can be selected.

According to an embodiment, said spectral lines of interest are monitored after having processed the parasite signals caused by the temperature of materials radiating in these spectral bands and causing a substantial noise which absolutely must be eliminated.

Accordingly, it suffices to proceed with infrared shots in narrow spectral wavelength bands around one or more of the above lines and to measure the relative density of the reflectance to characterize the ageing.

The preferred chosen field of the projected beam and therefore the measuring of its reflectance preferably occurs in the wave number interval [1,000 $cm^{-1}$; 4000 $cm^{-1}$] as shown in the example of FIG. 3, corresponding to the associated interval of wavelength [2.5 μm; 10 μm]. This choice results from the fact that from 10 μm the measuring means become costly, and that below 2.5 μm there is no pertinent observation.

According to an embodiment, there are as many infrared sources 101 emitting around the prescribed wavelengths of the spectral lines as there are peaks or lines of interest.

According to an embodiment, the infrared source 101 is directive to emit the first infrared radiation according to a first determined direction towards the polymer material M. For example, in the case of a diode for the source 101, the diode can comprise a lens. For a given source 101, the detector 102 will ideally be placed such that the reflection of the second measured infrared radiation 112 has an angle of reflection equal to the angle of incidence of the first infrared radiation 111 sent and where all (or almost) the energy emitted reappears in the second reflected infrared radiation 112; therefore a reflection is sought, specular, from which the reflectance will originate.

Of course, the reflection of the polymer material M could also be diffuse, in the half-space delimited by the surface 200 of the polymer material, containing the device 1.

According to an embodiment, the at least one infrared detector 102 is capable of receiving a spectrum of infrared reflectance of the polymer material M in response to the first infrared radiation(s) 111 emitted by the infrared source(s) 101. According to an embodiment, the at least one infrared detector 102 is capable of receiving in the second infrared radiation 112 the spectral line(s) R1, R2, R3, R4, R5, R6 at the prescribed wavelength(s). According to an embodiment, the at least one infrared detector 102 is capable of receiving in the second infrared radiation 112 the band(s) B1, B2, B3, B4, B5, B6 located around the spectral line(s) R1, R2, R3, R4, R5, R6 at the prescribed wavelength(s). The reception wavelength band of the infrared detector 102 comprises for example at least the prescribed wavelength(s) and/or the spectral line(s) R1, R2, R3, R4, R5, R6 of prescribed wavelength(s) and/or the wavelength band(s) emitted by the infrared source(s) 101. The at least one infrared detector 102 can be for example broadband in reception wavelength. According to an embodiment, the at least one infrared detector 102 is placed in the reflection, specular and/or diffuse, of the material M. The at least one infrared detector 102 is a photo-detector which can be for example of photodiode or photoconductor type. For example, the infrared detector 102 is capable of generating an electrical photocurrent as a function of the second infrared radiation 112. Acquisition electronics acquire the analog signal coming from the infrared detector 102.

According to an embodiment, the infrared source(s) 101 are capable of emitting towards the polymer material M the first infrared radiation 111 in the form of one or more time pulses i, i+1, i+2, which can be for example rectangular, as shown in FIG. 4. According to an embodiment, the device 1 comprises a module 12 for controlling the source(s) 101 by a pulse control signal, which can be for example rectangular and/or periodical in prescribed repetition frequency $f_R$, so that the source(s) emit the first infrared radiation 111 in the form of one or more time pulses, for example rectangular and/or periodical.

The successive time pulses i, i+1, i+2 emitted by the infrared source 101 can each have for example a respective prescribed time width (first ON state of the infrared source 101) $\tau_i$, $\tau_{i+1}$ and $\tau_{i+2}$, and have respective starts $A_i$, $A_{i+1}$ and $A_{i+2}$ of successive pulses i, i+1, i+2 which are spaced in time by respectively durations $T_i$ and $T_{i+1}$. Between the pulses i, i+1, i+2 found in the ON state, the source 101 is at the second OFF state (for example low or off) different to the first ON state (for example high or on), this OFF state between the successive pulses i and i+1 having a duration $T_i - \tau_i$.

According to an embodiment, the pulses i, i+1, i+2 can repeat with a prescribed period T, each duration $T_i$ being also equal to the period $T = T_i = T_{i+1}$, corresponding to a repetition frequency $f_R = 1/T$. According to an embodiment, the respective time widths $\tau_i$, $\tau_{i+1}$ and $\tau_{i+2}$ of the pulses can be equal to the same time width $\tau = \tau_i = \tau_{i+1} = \tau_{i+2}$.

For example, $\tau_{i+1} \leq T_i$ and $\tau_{i+2} \leq T_i$.

Of course, the respective time widths $\tau_i$, $\tau_{i+1}$ and $\tau_{i+2}$ could be different to each other. Of course, the durations $T_i$ and $T_{i+1}$ could be different to each other.

This characteristic enables to detect the prescribed wavelength line(s) in the second infrared radiation 112 received from the polymer material M, and this even in the presence of the heat radiation of this polymer material M. This heat radiation is due to the temperature of the sample measured (polymer material M) and is continually emitted with energy which can be up to about one thousand times greater than that of the second infrared radiation 112 reflected by this polymer material M in a narrow spectral band around the prescribed wavelength spectral line(s), which therefore disturbs detection of this second radiation 112 and the measured reflectance.

According to an embodiment, the device 1 comprises at least one manual control member 103 for triggering the sending of the first infrared radiation 111 by the at least one infrared source 101, for example according to a time pulse or a burst of time pulses i, i+1, i+2. According to an embodiment, the manual control member 103 can be prestressed by a prestress member (for example a spring or other) to return to a first position of non-actuation not triggering the sending of the first infrared radiation 111 by the source 101, from its second manual actuation position triggering the sending of the first infrared radiation 111 by the source 101, the control member being movable between one and the other of these first and second positions. The user must keep the control member 103 pressed in the second manual actuation position for triggering the sending of the first infrared radiation 111 by the source 101. The manual control member 103 can be of button or trigger type.

According to an embodiment, the infrared detector(s) 102 are controlled synchronously with the source(s) 101, as shown in FIGS. 4, 5 and 6. The device 1 or the unit 2 can comprise control means for starting the at least one infrared detector 102 synchronously with the time pulse(s) (i, i+1, i+2).

According to an embodiment, the control module 12 is connected at the same time to the source(s) 101 and to the infrared detector(s) 102 so that the infrared detector(s) 102 is started during the time pulses i, i+1, i+2 (in the first ON state of time width $\tau_i$), as shown for example in FIG. 5 by the points representing the measured values, and is switched off (second OFF state different to the first ON state) between the time pulses i, i+1, i+2.

According to an embodiment, the control module 12 is connected at the same time to the source(s) 101 and to the infrared detector(s) 102 so that the infrared detector(s) 102 is started during the time pulses i, i+1, i+2 (in the first ON state of time width $\tau_i$), as shown for example in FIG. 5 by the points representing the measured values, and is also started (second OFF state different to the first ON state) between the time pulses i, i+1, i+2, as is shown by way of example in FIG. 5. According to an embodiment, the infrared detector 102 takes several measurements of the second infrared radiation 112 received (represented by the points in FIG. 5) during each time pulse i, i+1, i+2.

As shown in FIG. 5, according to an embodiment the device 1 comprises control means 21 for taking several first measurements 300 of the second infrared radiation 112 over a first prescribed time width $\gamma_{i1}$ comprised in or equal to the respective time width $\tau_i$ of the first ON state of the pulse i (therefore $\gamma_{i1} \leq \tau_i$), to calculate an estimation of a first value $\hat{M}_{i-ON}$ representative of the first measurements 300 taken during the prescribed time width $\gamma_{i1}$, the parameter being calculated from the first value $\hat{M}_{i-ON}$.

According to an embodiment, the device 1 comprises a control means 21 for taking several second measurements 301 of the second infrared radiation 112 over a second prescribed time width $\gamma_{i2}$ comprised in or equal to the respective time width $T_i - \tau_i$ of the second OFF state between the pulse i and the following pulse i+1 or between the respective time width $T_{i-1} - \tau_{i-1}$ of the second OFF state between the pulse i and the preceding pulse i-1 (therefore $\gamma_{i2} \leq T_i - \tau_i$ or $\gamma_{i2} \leq T_{i-1} - \tau_{i-1}$) to calculate an estimation of a second value $\hat{M}_{i-OFF}$ representative of the second measurements 301 during the second prescribed time width $\gamma_{i2}$, the parameter being calculated from the second value $\hat{M}_{i+OFF}$.

According to an embodiment, the parameter is calculated from the first value $\hat{M}_{i-ON}$ and the second value $\hat{M}_{i-OFF}$, for example from the difference calculated between the first value $\hat{M}_{i-ON}$ and the second value $\hat{M}_{i-OFF}$. This compensates the zero offsets of the measurements 300 of the ON state relative to the OFF state.

According to an embodiment, the first value $\hat{M}_{i-ON}$ is calculated from a selection of the first measurements 300 having less than a prescribed distance relative to this first value $\hat{M}_{i-ON}$. According to an embodiment, the second value $\hat{M}_{i-OFF}$ is calculated from a selection of the second measurements 301 having less than a prescribed distance relative to this second value $\hat{M}_{i-OFF}$. In this way the outliers (represented by crosses in FIG. 5) among measurements 300 and 301 are eliminated. According to an embodiment, the multiple measurements of FIG. 5, acquired during a pulse i, serve to reduce electronic noise as statistical processing is applied to these measurements. According to an embodiment, the first value $\hat{M}_{i-ON}$ can be for example a median of the first measurements 300, a robust estimation of the average of the first measurements 300 or another central estimation (non-Gaussian). According to an embodiment, the second value $\hat{M}_{i-OFF}$ can be for example a median of the second measurements 301, a robust estimation of the average of the second measurements 301 or another central estimation (non-Gaussian). According to an embodiment, a frequential processing (via the filter 11) is then applied to the first value $\hat{M}_{i-ON}$, or to the difference calculated between the first value $\hat{M}_{i-ON}$ and the second value $\hat{M}_{i-OFF}$, to eliminate thermal noise of the polymer sample M.

Embodiments of the determination unit 2, are described hereinbelow in reference to FIGS. 2 and 6.

According to an embodiment, the device 1 comprises extraction means for extracting from the second infrared radiation 112 received from the infrared detector(s) 102 the response of the polymer material M to the spectral line(s) of prescribed wavelength(s) emitted by the infrared source(s) 101 and/or to the band(s) around the spectral line(s). These extraction means for example comprise one or more of the elements described hereinbelow.

According to an embodiment, the device 1 comprises at least one circuit and/or filter 11 for suppression or attenuation of a continuous component in a signal, having been provided by the infrared detector 102 from the second infrared radiation 112. All bodies of a temperature greater than absolute zero emit, as a function of temperature, radiation which follows Planck's law defining monochromatic emitting of the dark body as a function of the wavelength and its absolute temperature. At ambient temperature the range of emission is below the extent of long red waves and it is invisible to the human eye. The emissivity of an object indicates the quantity of infrared energy radiated. Objects measured by the device 1 tend to emit this heat radiation in the wavelength range ranging from 1 to 20 μm. Because of this, the second infrared radiation 112 received by the infrared detector 102 will comprise a continuous component and an alternative component (the second infrared radiation 112 of response to the first infrared radiation 111 having the prescribed spectral line(s)).

According to an embodiment, the circuit and/or the filter 11 is at least one circuit and/or at least one high-pass filter of the device 1 and/or at least one band-pass filter of the device 1. This enables to let only the spectrum of the useful signal pass and eliminates heat radiation corresponding to the continuous component of the spectrum. Decomposition in Fourier series of the second present infrared radiation 112 gives a spectrum constituted by a continuous component representing the average value of the signal and a suite of harmonics whereof the amplitude varies with the frequency at sin(x)/x. For example, the high-pass filter can be of the first order. A high-pass filter of the first order having a cutoff frequency of 1/(2T), where T is the repetition period of time pulses, enables to attenuate considerably the continuous component. But the continuous component of the restored signal depends on the attenuation of the filter. This problem is not important in our case as the amplitude of the rectangular signal can be determined by the difference between the high pulses and the low pulses. An amplifier, not shown, can be provided downstream from the filter 11. An amplifier 10 and a high-pass filter 11 can be provided for retrieve in the filtered signal the rectangular signal generated by the radiation 111 of the sources.

A test bench has been placed to validate the proposed pulsed acquisition architecture. In a single-channel prototype constructed by way of non-limiting example, a source 102 formed by a light-emitting diode has been controlled by a rectangular pulse control signal of repetition frequency $f_R$ of 4 kHz and cyclic ratio 20%. The bench is constituted by the infrared detector, a light-emitting diode and a transimpedance amplifier. The aim has been to generate, in the photo-detector (infrared detector), a rectangular signal smaller enough than the signal generated by the temperature. An LED was used emitting a rectangular signal. The photocurrent emanating from the detector is then sent to the transimpedance amplifier. Measuring the continuous component gives a photocurrent of the order of 40A which would correspond to the signal created by heat radiation. The signal was then filtered (high-pass) and amplified to reconstruct the alternative component generated by the LED. Attenuation of 12 dB, a cutoff frequency of 0.3 Hz, and a gain of 1 pA/V enable to restore a signal (rectangular pulses of repetition frequency $f_R$ of 4 kHz and cyclic ratio 20%) more than 1,000 times smaller than the continuous background. This measuring validates the pulsed architecture for the single-channel prototype.

Therefore, according to an embodiment the device according to the invention takes into account the processing of the noise caused by heat radiation. According to an embodiment, the solution consists of emitting pulsed shots according to a rectangular signal of amplitude and prescribed wavelength and prescribed repetition frequency $f_R$, signals whereof the reflection measured by the detector 102 will be processed temporally by a Fourier development, the effect being to eliminate the noise of the heat radiation.

According to an embodiment, the device 1 comprises a cooling module 13, for example of Peltier type, for cooling the infrared detector(s) 102 and/or a cooling module 13', for example of Peltier type for cooling the source(s) 101. This cools the source 101 and the detector 102 to a stable temperature. In particular a Peltier cooling module is small in size, lending more compactness to the device 1.

A cooling module 13, 13' of Peltier type is made up of a stack of thermoelements. A thermoelement is constituted by two semiconductor components. When continuous current is imposed on the terminals of the cooling module 13, 13' of Peltier type, heat absorption occurs. The absorbed heat is then transmitted to the hot part of the component, which has the effect of heat transmission from one side to the other of the module 13, 13'.

According to an embodiment, the device 1 comprises a thermostat and an electronic unit 9 for automatic temperature stabilization or temperature controller (based on a regulator of Proportional, Integrator and Differential type), which is connected to the cooling module(s) 13, 13', for example of Peltier type, for maintaining the at least one infrared detector (102) and/or the at least one infrared source (101) at a temperature prescribed by the thermostat. For example, the temperature controller 9 regulates the temperatures of the LED source 101 and of the detector 102 typically around a given guideline at −30° C.

The unit 9 can be analog or digital and be embedded in a system on chip (SOC) for example a micro-controller, a programmable logic circuit (Field Programmable Gate Array FPGA), or a dedicated integrated circuit (Application Specific Integrated Circuit—ASIC).

According to an embodiment, the device 1 comprises an amplifier 10 downstream from the circuit and/or the filter 11 for amplifying the filtered signal. This amplifier 10 can be a transimpedance amplifier.

According to an embodiment, the device 1 comprises an analog-to-digital converter 5 downstream from the amplifier 10. An electronic system for controlling and monitoring the analog-to-digital converter 5 is provided. The analog-to-digital converter 5 enables to generate the digital signal corresponding to the reflectance of the polymer material M at each prescribed wavelength.

According to an embodiment, the device 1 comprises means 107 for processing and storing data, to determine the parameter from at least the importance of the line(s) of prescribed wavelength(s) in the detection signal of the infrared detector(s), obtained from the second infrared radiation 112, or from the importance of the response of the infrared detector(s) in bands around the line(s) of prescribed wavelength(s) in the second infrared radiation 112. In the example described hereinabove, the means 107 for processing and storing data determine the parameter from the digital signal(s) provided by the analog-to-digital converter 5, which correspond respectively to this amplitude according to the respective line(s) and respective prescribed wavelength(s). According to an embodiment, the means 107 for processing and storing data can comprise a module for processing by Fourier transform, instead of or in addition to the circuit and/or filter 11. Also, these means 107 for processing and storing data can comprise the control means 21 for taking measurements as above and for selecting the measurements as above.

According to an embodiment, the device 1 comprises means 109 for downloading computer programs, which can comprise software programs implementing an algorithm embedded for the above determination. The means 107, 109 can comprise an electronic loading system for this purpose, such as a microcontroller, a FPGA, an ASIC, etc.

According to an embodiment, the device 1 comprises a guard 110 for positioning the infrared source 101 and the infrared detector 102 facing and/or near a zone S of the polymer material M which has to receive the first infrared radiation 111 and reflect the second infrared radiation 112. According to an embodiment, the guard 110 is arranged so that the external block 1011 is at a distance from the surface 200 of the polymer material M, whenever the guard 110 is positioned against the surface 200 of the polymer material M. For example, the external block 1011 has an external distal surface 1013, which is at the same time oriented towards the surface 200 of the polymer material M and which is retracted relative to the external distal surface 113 of the guard 110, also turned towards the surface 200 of the polymer material M. For example, the angle of incidence of the first infrared radiation 111 on the surface 200 of the polymer material M to be tested can be greater than or equal to 10 degrees or 20 degrees and less than or equal to 60 or 70 degrees and can be ensured by the positioning of the guard 110 and/or of the external block 1011 against this surface 200. For example, the angle of reflection of the second infrared radiation 112 on the surface 200 of the polymer material M to be tested can be greater than or equal to 10 degrees or 20 degrees and less than or equal to 60 or 70 degrees and can be ensured by the positioning of the guard 110 and/or of the external block 1011 against this surface 200. For example, the distance between the infrared source(s) 101 and the surface 200 of the polymer material M to be tested can be greater than or equal to 1 mm and less than or equal to 10 cm and can be ensured by the positioning of the guard 110 against this surface 200. For example, the distance between the infrared detector(s) 102 and the surface 200 of the polymer material M to be tested can be greater than or equal to 1 mm and less than or equal to 10 cm and can be ensured by the positioning of the guard 110 against this surface 200.

According to an embodiment, the device 1 has the shape of a pistol 100 comprising a grip handle 14 attached to a sighting module 15 comprising at a front end 16 away from the handle 15 the source 101 and the detector 102 (and/or the application surface 1010 and the guard 110 in front of and near the source 101 and the detector 102). The control member 103 is for example near a zone 17 of the pistol 100 connecting the handle 14 to the sighting module 15. This handle thereby also enables to introduce the device 1 into conduits or against an inner surface of a tube. Of course, the device 1 can assume any other shape, such as for example the shape of a pen or the like.

According to an embodiment, the device 1 comprises information indication means 104, which can be visual and/or sound and which can be information indicating the parameter such as for example the presence of the ageing tracer(s) or information indicating the absence of the ageing tracer(s), and/or information indicating the content of the ageing tracer(s) and/or information indicating the identification of the polymer material M. The indication means 104 can be or comprise for example a display screen 104. Other operating characteristics of the device 1 can be indicated by the indication means 104.

According to an embodiment, the device 1 can comprise a control interface 105 which can be other than the control member 103 and which can be for example a control keyboard 105, for example on a rear surface 18 away from the source 101 and the detector 102, for example of the zone 17.

According to an embodiment, the device 1 comprises autonomous power supply means 106 for supplying power to the above elements, including at least the source 101, the detector 102 and the unit 2. These autonomous power supply means 106 are for example storage battery or battery rechargeable or not, detachable or not. According to an embodiment, the device 1 is portable.

According to an embodiment, the device 1 comprises communication means 108 for transmitting to the outside information indicating the parameter, which can be information indicating the presence of the ageing tracer(s) or information indicating the absence of the ageing tracer(s), and/or information indicating the content of the ageing tracer(s) and/or information indicating the identification of the polymer material M. The communication means 108 may be uplink and/or downlink communication towards a remote unit or a remote platform, such as for example a mobile terminal (mobile telephone or other), a server or the like.

According to an embodiment, the unit 2 of the device 1 comprises one or more micro-controllers, FPGAs, or ASICs 19 for controlling the different elements above.

For example, the micro-controller 19 proceeds with the following timing:

A—orders of measurements by pressing the trigger 103,

B—temperature set point control of the source 101 and of the detector 102, C—control for sending the ON/OFF pulses for the source 101, D—control for receiving and storing the measurements coming from the converter 5, E—Fourier frequency processing control for suppressing noise due to ambient temperature→source 101 following return to C (for conducting steps C, D, E etc.)

F—Once the signals of all the sources 101 are received: sending of measurements (for example 4 measurements for 4 sources) to the processing module 107 for converting the measurements into pertinent data, characterizing the ageing or the polymer material.

For example, to take a sequence of measurements, the device 1 or pistol 100 is placed on a wall of a polymer material M by applying the guard 110 to position and chock the pistol 100 against the surface 200 of the material M to be tested. Next, the control member 103 or the trigger 103 is pressed according to fixed protocol. This makes it possible to make several shots and proceed with processing and storage of data by the means 107, said measurements having been previously displayed on the control screen 104 with a visual or sound indicator implementing the measurement or not.

An operator fitted with the device 1 can easily and quickly take measurements of the parameter of the material at different placements. For example, it can result in a control campaign inside a reactor building of a nuclear power plant. Varied polymer materials M could be controlled with the same apparatus 1. The result of measurements and/or diagnosis of the ageing or of identification can be displayed in-situ and in real time on the device 1. The measuring device omits spectral measuring of the reflectance or absorbance characteristic of the polymer material and dispenses with the use of a spectrometer, especially a spectrometer of FTIR or filter type. The measuring device dispenses with optical filters and mechanical system for switching from one wavelength to another. This enables to produce a portable device, light and easy to introduce for taking measurements for example inside piping. The measuring device dispenses with mechanical shifting of parts and needs no isolation chambers.

The invention claimed is:

1. A portable device for estimating at least one parameter characteristic of a polymer material, wherein the device comprises:
    at least one infrared source,
    each infrared source being capable of emitting towards the polymer material a spectral line, representing maximum emission energy, selected in one of wavelengths 10 µm, 9.5 µm, 7.2 µm, 6 µm, 3.5 µm, 2.7 µm or in one of wave numbers 1000 $cm^{-1}$, 1050 $cm^{-1}$, 1350 $cm^{-1}$, 1700 $cm^{-1}$, 2900 $cm^{-1}$, 3700 $cm^{-1}$, wherein the width at half height of the spectral line of the at least one infrared source is less than or equal to 1 µm,
    at least one infrared detector, capable of receiving the spectral line, which is reflected by the polymer material in response to the spectral line, having been emitted by the at least one infrared source, wherein the width at half height of the spectral line having been reflected by the polymer material and having been received by the infrared detector in response to the spectral line having been emitted by the at least one infrared source is less than or equal to 1 µm, and
    a determination unit for determining the parameter characteristic of the polymer material as a function of the energy present in said spectral line, having been reflected by the polymer material and having been received by the infrared detector in response to the spectral line having been emitted by the at least one infrared source.

2. The device according to claim 1, wherein the spectral line is narrowband of emission.

3. The device according to claim 1, wherein the parameter characteristic of the polymer material is the presence and/or content of at least one ageing tracer in the polymer material.

4. The device according to claim 1, wherein the parameter characteristic of the polymer material is an identification of the polymer.

5. The device according to claim 1, wherein each infrared source is capable of emitting towards the polymer material the spectral line in the form of one or more time pulses.

6. The device according to claim 5, wherein the one or more time pulses are rectangular.

7. The device according to claim 5, wherein control means are provided for starting the at least one infrared detector synchronously with the one or more time pulses.

8. The device according to claim 5, comprising a control means for taking several first measurements of the spectral line, which has been reflected by the polymer material as a response to the spectral line having been emitted by the at least one infrared source over a first prescribed time width comprised in or equal to a respective time width of at least one of the pulses, to calculate an estimation of a first value representative of the first measurements, the parameter being calculated from at least the first value.

9. The device according to claim 8, comprising a control means for taking several second measurements of the spectral line, which has been reflected by the polymer material as a response to the spectral line having been emitted by the at least one infrared source over a second prescribed time width comprised in or equal to a respective time width between two successive pulses, to calculate an estimation of a second value representative of the second measurements, the parameter being calculated at least from a difference between the first value and the second value.

10. The device according claim 1, comprising at least one manual control member for triggering the emission of the spectral line by the at least one infrared source.

11. The device according to claim 1, wherein the at least one infrared source is at least one infrared light-emitting diode or at least one laser source.

12. The device according to claim 1, wherein the at least one infrared detector is of photodiode or photoconductor type and is capable of generating an electrical photocurrent as a function of the spectral line, which has been reflected by the polymer material as a response to the spectral line having been emitted by the at least one infrared source, which it receives.

13. The device according to claim 1, wherein the at least one infrared source comprises at least two infrared sources, which are capable of emitting towards the polymer material respectively two different spectral lines, each representing a maximum emission energy, selected in respectively two different of the wavelengths 10 µm, 9.5 µm, 7.2 µm, 6 µm, 3.5 µm, 2.7 µm or in respectively two different of the wave numbers 1000 $cm^{-1}$, 1050 $cm^{-1}$, 1350 $cm^{-1}$, 1700 $cm^{-1}$, 2900 $cm^{-1}$, 3700 $cm^{-1}$.

14. The device according to claim 1, wherein the unit for determining the parameter characteristic of the polymer material comprises at least one filter or circuit for suppression or attenuation of a continuous component in a signal, having been provided by the infrared detector from the spectral line, which has been reflected by the polymer material as a response to the spectral line having been emitted by the at least one infrared source.

15. The device according to claim 14, wherein the unit for determining the parameter characteristic of the polymer material comprises an amplifier for amplifying the filtered signal downstream from the filter or circuit, an analog-to-digital converter downstream from the amplifier and means for processing and storing data, to determine the parameter characteristic of the polymer material from digital signal(s) provided by the analog-to-digital converter.

16. The device according to claim 1, wherein the determination unit is configured to calculate the parameter characteristic of the polymer material as a function at least of the amplitude of a detection signal obtained from the infrared detector and from the spectral line, which has been reflected by the polymer material as a response to the spectral line having been emitted by the at least one infrared source and which is received by the at least one infrared detector.

17. The device according to claim 1, wherein the determination unit is configured to calculate the parameter characteristic of the polymer material as a function of an amplitude of a detection signal obtained from the infrared detector and from the spectral line, which has been reflected by the polymer material as a response to the spectral line having been emitted by the at least one infrared source and which is received by the at least one infrared detector, relative to an amplitude of an emission signal serving to control the at least one infrared source to emit the at least one spectral line.

18. The device according to claim 1, comprising a first cooling module, for cooling the at least one infrared detector and/or a second cooling module, for cooling the at least one infrared source.

19. The device according to claim 18, comprising a thermostat and an electronic unit for automatic temperature stabilization which is connected to the first cooling module, for maintaining the at least one infrared detector and/or to the second cooling module, for maintaining the at least one infrared source at a temperature prescribed by the thermostat.

20. The device according to claim 1, having a shape of a pistol comprising a grip handle attached to a sighting module comprising at a front end away from the grip handle the at least one infrared source and the at least one infrared detector, the pistol comprising at least one manual control member for triggering emission of the at least one spectral line by the at least one infrared source, wherein the manual control member is located on the grip handle and between the grip handle and the sighting module.

21. The device according to claim 1, wherein the at least one source and/or the at least one infrared detector are covered by at least one external block, the at least one source being capable of emitting the at least one spectral line and the at least one infrared detector being capable of receiving the spectral line, which has been reflected by the polymer material as a response to the spectral line having been emitted by the at least one infrared source through the external block which is transparent to the latter and which is turned towards the polymer material.

22. The device according to claim 21, comprising a guard for support against the polymer material, the external block having an external distal surface, which is at the same time oriented towards the polymer material and which is retracted relative to an external distal surface of the guard, also turned towards the surface of the polymer material.

23. A method for estimating at least one parameter characteristic of a polymer material, wherein at least one spectral line of emission, representing maximum emission energy, selected in at least one of wavelengths 10 μm, 9.5 μm, 7.2 μm, 6 μm, 3.5 μm, 2.7 μm or in one of wave numbers 1000 $cm^{-1}$, 1050 $cm^{-1}$, 1350 $cm^{-1}$, 1700 $cm^{-1}$, 2900 $cm^{-1}$, 3700 $cm^{-1}$, is emitted by at least one infrared source towards the polymer material, wherein the width at half height of the at least one spectral line of the at least one infrared source is less than or equal to 1 μm, the spectral line, which is reflected by the polymer material in response to the spectral line having been emitted by the at least one infrared source, is received by at least one infrared detector, wherein the width at half height of the spectral line having been reflected by the polymer material and having been received by the infrared detector in response to the spectral line having been emitted by the at least one infrared source is less than or equal to 1 μm, and the parameter characteristic of the polymer material is determined by a determination unit as a function of the energy present in said at least one spectral line, having been reflected by the polymer material and having been received by the infrared detector in response to the spectral line having been emitted by the at least one infrared source.

* * * * *